(12) United States Patent
Sallaway et al.

(10) Patent No.: US 7,372,863 B2
(45) Date of Patent: May 13, 2008

(54) SYSTEMS FOR MONITORING AND CONTROLLING OPERATING MODES IN AN ETHERNET TRANSCEIVER AND METHODS OF OPERATING THE SAME

(75) Inventors: Peter J. Sallaway, San Diego, CA (US); Douglas Easton, Westlake Village, CA (US); Matt Webb, Woodland Hills, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1918 days.

(21) Appl. No.: 09/751,037

(22) Filed: Dec. 29, 2000

(65) Prior Publication Data
US 2002/0085628 A1 Jul. 4, 2002

(51) Int. Cl.
*H04L 12/28* (2006.01)

(52) U.S. Cl. .................. 370/419; 370/463; 370/466

(58) Field of Classification Search .............. 370/254, 370/255, 461–466, 469, 401, 402, 418–420; 709/200–203, 208, 209, 220–221, 227–232, 709/236, 321–329; 710/309, 311–315; 375/219, 375/220
See application file for complete search history.

(56) References Cited

U.S. PATENT DOCUMENTS

| | | | | |
|---|---|---|---|---|
| 5,504,738 A * | 4/1996 | Sambamurthy et al. ...... 370/296 |
| 5,696,899 A * | 12/1997 | Kalwitz ...................... 709/228 |
| 5,740,163 A * | 4/1998 | Herve ......................... 370/271 |
| 5,838,904 A * | 11/1998 | Rostoker et al. ............ 709/250 |
| 6,122,667 A * | 9/2000 | Chung ......................... 709/228 |
| 6,215,789 B1 * | 4/2001 | Keenan et al. .............. 370/399 |
| 6,408,347 B1 * | 6/2002 | Smith et al. .................. 710/36 |
| 6,446,192 B1 * | 9/2002 | Narasimhan et al. ........ 712/29 |
| 6,470,053 B1 * | 10/2002 | Liu ............................ 375/257 |
| 6,516,352 B1 * | 2/2003 | Booth et al. ................ 709/250 |
| 6,598,109 B1 * | 7/2003 | McAlister et al. .......... 710/306 |
| 6,661,804 B2 * | 12/2003 | Fellman et al. ............. 370/420 |
| 6,721,916 B2 * | 4/2004 | Agazzi et al. .............. 714/752 |

* cited by examiner

*Primary Examiner*—Doris H. To
*Assistant Examiner*—Ian N. Moore

(57) ABSTRACT

Disclosed are systems and methods for monitoring and controlling operating modes in a network transceiver. In one embodiment, a computer system is associable with an Ethernet network, and comprises a processing unit, a memory and a transceiver. The transceiver comprises an encoder, a decoder and a controller. The controller controls operating modes of the transceiver, and, specifically, (i) negotiates a communications channel between the computer system and another computer system over the Ethernet network wherein the computer system enters one of a master state and a slave state, and (ii) repeatedly directs, in response to entering the master state or slave state, the encoder to encode data to be transmitted to the another computer in one of an industry-compliant mode and a custom mode until the encoded data is properly received by the other computer.

51 Claims, 6 Drawing Sheets

SYSTEMS FOR MONITORING AND CONTROLLING OPERATING MODES IN AN ETHERNET TRANSCEIVER AND METHODS OF OPERATING THE SAME

TECHNICAL FIELD OF THE INVENTION

The present invention is directed generally to communications networks and, more particularly, to systems for monitoring and controlling operating modes in a network transceiver and to methods of operating the same.

BACKGROUND OF THE INVENTION

The commercial availability of more efficient, reliable and and cost effective computer systems and communication networks has enabled businesses and individuals to rely on the same, and related peripheral devices, to meet their information and processing needs.

The immeasurable gains in technology experienced by the computer and communication industries have enabled these computers and communication devices to be standardly equipped with interchangeable and replaceable parts and devices. Interchangeability is typically facilitated through expansion slots, couplable interfaces or the like.

Conventional network communications employ various communications protocols that enable cooperative communication at each networked computer system. Standards bodies, such as the Institute of Electronic and Electrical Engineers ("IEEE"), establish standardized communication protocols to facilitate communication over such communication networks. Since standardized protocols maintain different communication platforms, equipment manufacturers must provide support for connection using many, and theoretically all, communications protocols.

A problem arises however when an equipment manufacturer develops and distributes large quantities of non-standardized communication products and devices into a substantially standardized components market. There exists in such a scenario a need to facilitate compatibility with this established communications and processing base, and thus to enable the operating modes of communication devices to be extendable to both industry-compliant and custom modes to achieve increased connectivity and compatibility than would otherwise be possible.

SUMMARY OF THE INVENTION

To address the above-discussed deficiencies of the prior art, the present invention broadly provides, systems for monitoring and controlling operating modes in a network transceiver as well as methods of operating the same. A controller is introduced illustratively herein for use with an Ethernet transceiver, having both an encoder and a decoder. The controller is associated with the encoder and decoder and operates to control operating modes of the transceiver.

According to an exemplary embodiment, the controller comprises both an encoder portion and a decoder portion. The encoder portion is operable to direct the encoder to encode data in one of an industry-compliant mode and a custom mode. The decoder portion is operable, in response to sensing data received in custom mode at the decoder, to direct: (i) the decoder to decode the received data in custom mode, and (ii) the encoder portion to direct the encoder to encode data in custom mode. In a preferred embodiment, the industry-compliant mode is compliant with IEEE 802.3ab, an Ethernet standard.

In a related embodiment, the controller further comprises a reset portion that is operable to reset the operating mode of the transceiver to industry-compliant mode. Advantageously, the reset portion may be associated with the decoder portion and operate to direct both the decoder and encoder portions to direct respectively, the decoder to decode the received data in industry-compliant mode and the encoder to encode data in industry-compliant mode.

According to an advantageous embodiment, the principles hereof are implemented in a computer system for association with an Ethernet network. The computer system comprises a processing unit, a memory that is associated with the processing unit, and an Ethernet transceiver. The Ethernet transceiver, which is associated with each of the processing unit and the memory, associates the computer system with the Ethernet network.

The Ethernet transceiver comprises an encoder, a decoder and a controller. The encoder encodes data to be transmitted by the Ethernet transceiver over the Ethernet network. The decoder decodes data received by the Ethernet transceiver over the Ethernet network. The controller, which is associated with the decoder and the encoder, controls operating modes of the Ethernet transceiver and is operable to (i) negotiate a communications channel between the computer system and another computer system associated with the Ethernet network, the computer system entering one of a master state and a slave state, (ii) direct, in response to entering the master state, the encoder to encode data to be transmitted to the another computer in an industry-compliant mode and, if the encoded data is not properly received by the another computer, to encode data to be transmitted to the another computer in a custom mode, (iii) direct, in response to entering the slave state, the decoder to decode data received from the another computer in the industry-compliant mode and, if the received data cannot properly be decoded, to decode the received data in the custom mode.

According to an alternate advantageous embodiment of the Ethernet transceiver, the controller is operable to (i) negotiate a communications channel between the computer system and another computer system associated with the Ethernet network, the computer system entering one of a master state and a slave state, (ii) direct, in response to entering the master state, the encoder to encode data to be transmitted to the another computer in a custom mode and, if the encoded data is not properly received by the another computer, to encode data to be transmitted to the another computer in an industry-compliant mode, and (iii) direct, in response to entering the slave state, the decoder to decode data received from the another computer in the custom mode and, if the received data cannot properly be decoded, to decode the received data in the industry-compliant mode.

According to yet another alternate advantageous embodiment of the Ethernet transceiver, the controller is operable to (i) negotiate a communications channel between the computer system and another computer system associated with the Ethernet network, the computer system entering one of a master state and a slave state, and (ii) repeatedly directs, in response to entering one of the master state and the slave state, the encoder to encode data to be transmitted to the another computer in one of an industry-compliant mode and a custom mode until the encoded data is properly received by the another computer.

The foregoing has outlined rather broadly the features and technical advantages of the present invention so that those skilled in the art may better understand the DETAILED DESCRIPTION OF THE INVENTION that follows. Additional features and advantages of the invention will be described hereinafter that form the subject of the claims of the invention. Those skilled in the art should appreciate that they may readily use the conception and specific embodiments disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or;

the phrases "associated with" and "associated therewith," as well as derivatives thereof, and the term "associable" may mean to include, be included within, interconnect with, contain, be contained within, connect to or with, couple to or with, be communicable with, cooperate with, interleave, juxtapose, be proximate to, be bound to or with, have, have a property of, or the like; and the terms "controller" and "processor" mean any device, system or part thereof that controls at least one operation, such a device may be implemented in hardware, firmware or software, or some suitable combination of at least two of the same. It should be noted that the functionality associated with any particular controller/processor may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which like numbers designate like parts and in which.

DETAILED DESCRIPTION

FIGS. 1 through 5, discussed below, and the various embodiments used to describe the principles of the present invention in this patent document are presented by way of illustration only and should not be construed to limit the scope of the invention in any manner. Those skilled in the art will understand that the principles of systems for monitoring and controlling the operating modes of a network transceiver, and methods of operating the same, set forth herein may be implemented in association with any suitably arranged processing system.

Figure 1:
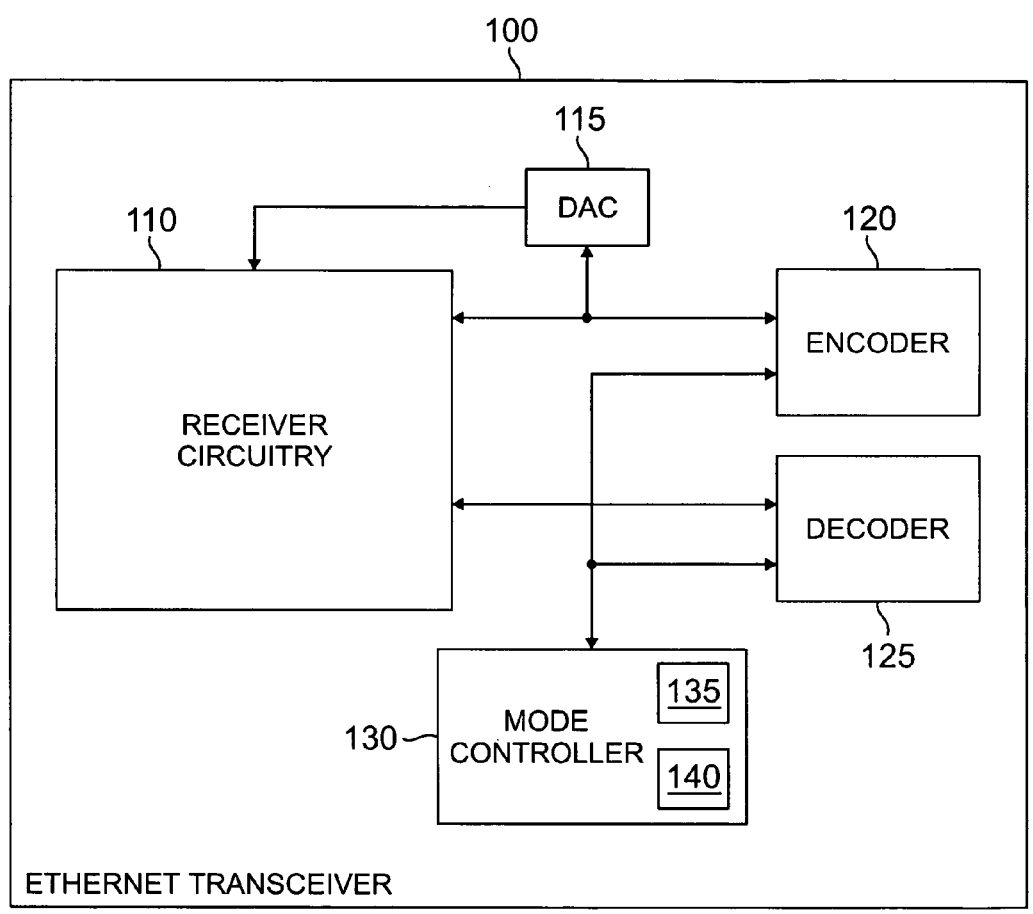
FIG. 1 illustrates a block diagram of an exemplary network transceiver that is operable to communicate in at least an industry-compliant mode and a custom mode, all in accord with the principles of the present invention.

Referring initially to FIG. 1, illustrated is a block diagram of an exemplary network transceiver 100, illustratively, an Ethernet transceiver, that is operable to communicate in at least an industry compliant mode (e.g., IEEE 802.3ab ("Gigabit Media Independent Interface")) and a custom mode, all in accord with the principles of the present invention. Exemplary Ethernet transceiver 100, also known as a medium access unit ("MAU"), actually applies signals onto an Ethernet network wire (not shown) and detects signals passing there through. According to the illustrated embodiment, Ethernet transceiver 100 may suitably be associated with a network interface card ("NIC"), which is described with reference to FIG. 3.

Ethernet transceiver 100 illustratively includes receiver circuitry 110, a digital-to-analog converter ("DAC") 115, an encoder 120, a decoder 125 and a mode controller 130. Exemplary receiver circuitry 110 is operable to receive analog signals in at least industry-compliant and custom modes, and may suitably include conventional components such as a automatic gain control ("AGC"), an analog-to-digital converter, baseline-wander-correction circuitry, a feed-forward equalizer ("FFE"), a decision feedback equalizer ("DFE")/trellis decoder, echo/next canceller circuitry, timing/phase recovery circuitry, and the like. Added description of such conventional components is superfluous and will not be further undertaken in this patent document. It is nevertheless noted that Ethernet transceiver 100 is preferably a complete 10,/100/1000 BASE-T solution operable to integrate circuitry necessary to provide 100/1000 BASE-T Ethernet on-a-chip, and to provide an interface to an external 10 BASE-T transceiver for 10,/100/1000 BASE-T support.

Exemplary DAC 115 is operable to convert digital data signals into analog data signals. Exemplary encoder 120 is operable to encode data signals coded in a first format into a second format. Exemplary decoder 125 is operable to decode data signals coded in a first data format into a second data format. Exemplary mode controller 130 is associated with encoder 120 and decoder 125, and operates to control the at least two operating modes of Ethernet transceiver 100.

Mode controller 130 illustratively includes both an encoder portion 135 and a decoder portion 140. Exemplary encoder portion 135 is operable to direct encoder 120 to encode data in at least one of industry-compliant mode or custom mode. Exemplary decoder portion 140 is similarly operable to direct decoder 125 to decode data received at Ethernet transceiver 100 in at least one of industry-compliant mode or custom mode. Additionally, according to the illustrated embodiment, decoder portion 140 is further operable, in response to sensing data received in custom mode at decoder 125, to direct (i) decoder 125 to decode the received data in custom mode and (ii) direct encoder portion 135 to direct encoder 125 to encode data in custom mode.

The principles hereof may advantageously be implemented in a computer system (shown with reference to FIG. 3) for association with an Ethernet network. The Ethernet transceiver 100, which is associated with each of a processing unit and a memory, associates the computer system with the Ethernet network. Ethernet transceiver 100 comprises controller 130 that is associated with encoder 120 and decoder 125, is operable to (i) negotiate a communications channel between the computer system and another computer system associated with the Ethernet network, the computer system entering one of a master state and a slave state, and (ii) repeatedly directs, in response to entering one of the master state and the slave state, encoder 120 to encode data to be transmitted to the another computer in one of industry-compliant mode and custom mode until the encoded data is properly received by the another computer.

Figure 2A:
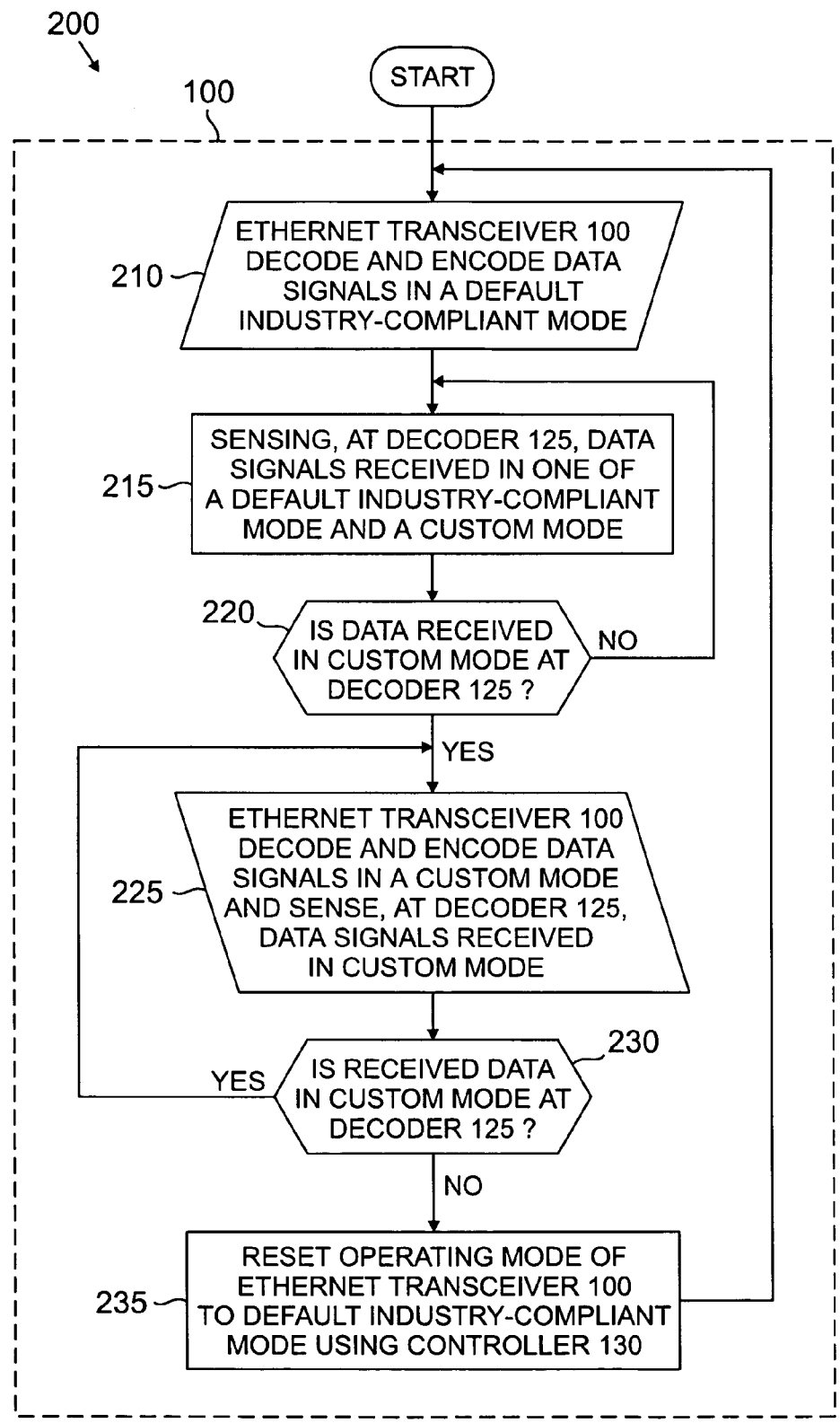
FIG. 2a illustrates a flow diagram of an exemplary method of operating the network transceiver of FIG. 1 to communicate in a default industry compliant mode and to switch and communicate in a custom mode, all in accord with the principles of the present invention.

Referring next to FIG. 2a, illustrated is a flow diagram of an exemplary method of operating a network transceiver 100, such as the Ethernet transceiver of FIG. 1 (generally designated 200) to communicate in a default industry-compliant mode and to switch and communicate in at least a custom mode, all in accord with the principles of the present invention. For purposes of illustration, concurrent reference is made to exemplary Ethernet transceiver 100 introduced with reference to FIG. 1.

Exemplary method 200 operates Ethernet transceiver 100 when associated with a computer system that is associated with a computer network (an exemplary computer system and computer network are described with reference to FIG. 3) to allow operating modes of Ethernet transceiver 100 to be monitored and controlled. In one preferred implementation, Ethernet transceiver 100 comprises a mode controller 130 that repeatedly directs, in response to transceiver 100 entering a master state or a slave state, encoder 120 to encode data to be transmitted in industry-compliant mode or custom mode until the encoded data is properly received over the computer network.

To begin, Ethernet transceiver 100 uses encoder 120 and decoder 125 to respectively encode and decode data signals in a default industry-compliant mode (process step 210), which is compliant with IEEE 802.3ab according to the illustrated embodiment. Mode controller 130 operates to sense whether data received at decoder 125 is in at least one of industry-compliant mode and custom mode (process step 215). In the illustrated embodiment, Ethernet transceiver 100 operates in a default industry-compliant mode and mode controller 130 operates to sense whether data received at decoder 125 is in custom mode.

In response to sensing data received at decoder 125 in custom mode ("Y" branch of decision step 220), mode controller 130, and particularly, decoder portion 140 thereof, directs (i) decoder 125 to decode received data signals in custom mode, and (ii) encoder portion 135 to direct encoder 120 to encode data signals to be transmitted in custom mode; which collectively cause Ethernet transceiver 100 to use encoder 120 and decoder 125 to respectively encode and decode data signals in custom mode (process step 225). In the illustrated embodiment, Ethernet transceiver 100 continues to operate in custom mode while mode controller 130 operates to sense whether data received at decoder 125 is in industry-compliant mode.

In response to sensing data received at decoder 125 in default industry-compliant mode ("N" branch of decision step 230), mode controller 130, and particularly, decoder portion 140 thereof, resets the operating mode of Ethernet transceiver 100 to default industry-compliant mode (process step 235). In resetting the operating mode of Ethernet transceiver 100, mode controller 130, and again, decoder portion 140, directs (i) decoder 125 to decode the received data signals in industry-compliant mode and (ii) encoder portion 135 to direct encoder 120 to encode data signals to be transmitted in industry-compliant mode; which collectively cause Ethernet transceiver 100 to use encoder 120 and decoder 125 to respectively encode and decode data signals in default industry-compliant mode.

According to one implementation of the preferred embodiment introduced here above, mode controller 130, in controlling operating modes of Ethernet transceiver 100, negotiates a communications channel between the computer system with which it is associated and another computer system associated with the computer network. Controller 130, in response thereto, enters into a master state or a slave state, and directs:

in response to entering the master state, encoder 120 to encode data to be transmitted to the another computer in industry-compliant mode and then, if the encoded data is not properly received by the another computer, to encode data to be transmitted to the another computer in a custom mode, or in response to entering the slave state, decoder 125 to decode data received from the another computer in the industry-compliant mode and then, if the received data cannot properly be decoded, to decode the received data in the custom mode.

Figure 2B:
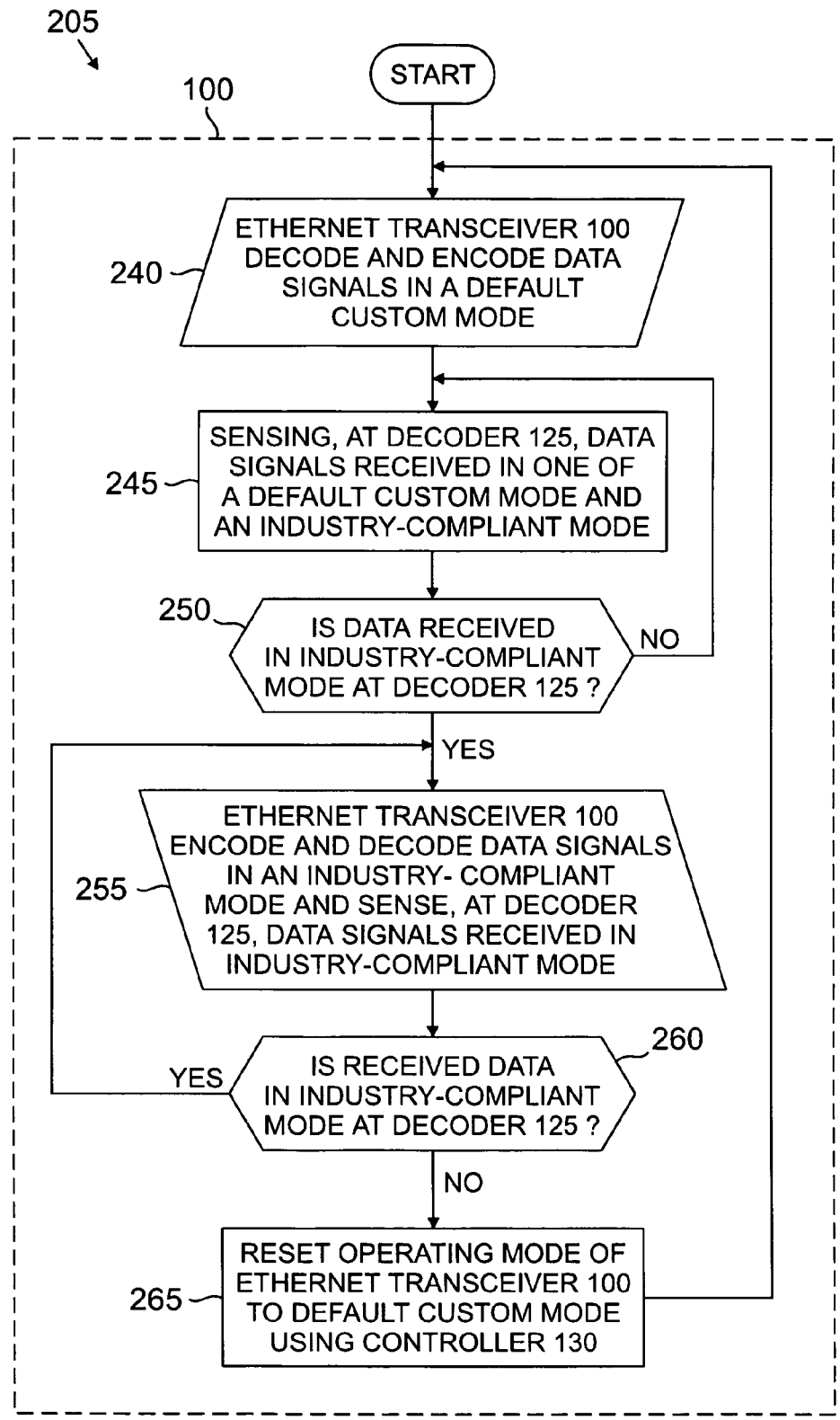
FIG. 2b illustrates a flow diagram of an alternate exemplary method of operating the network transceiver of FIG. 1 to communicate in a default custom mode and to switch and communicate in an industry compliant mode, all in accord with the principles of the present invention.

Referring next to FIG. 2b, illustrated is a flow diagram of an alternate exemplary method of operating a network transceiver 100, again, such as the Ethernet transceiver of FIG. 1 (generally designated 205) to communicate in a default custom mode and to switch and communicate in at least one industry-compliant mode, all in accord with the principles of the present invention. Again, for purposes of illustration, concurrent reference is made to exemplary Ethernet transceiver 100 introduced with reference to FIG. 1.

Exemplary method 205 operates Ethernet transceiver 100 when associated with a computer system that is associated with a computer network (both are described with reference to FIG. 3) to allow operating modes of Ethernet transceiver 100 to be monitored and controlled. Again, in one preferred implementation, Ethernet transceiver 100 comprises mode controller 130 that repeatedly directs, in response to transceiver 100 entering a master state or a slave state, encoder 120 to encode data to be transmitted in industry-compliant mode or custom mode until the encoded data is properly received over the computer network.

To begin, Ethernet transceiver 100 uses encoder 120 and decoder 125 to respectively encode and decode data signals in a custom mode (process step 240). Mode controller 130 operates to sense whether data received at decoder 125 is in at least one of industry-compliant mode and custom mode (process step 245). In the illustrated embodiment, Ethernet transceiver 100 operates in a custom mode and mode controller 130 operates to sense whether data received at decoder 125 is in industry-compliant mode, which is compliant with IEEE 802.3ab according to the illustrated embodiment.

In response to sensing data received at decoder 125 in industry-compliant mode ("Y" branch of decision step 250), mode controller 130, and particularly, decoder portion 140 thereof, directs (i) decoder 125 to decode received data signals in industry-compliant mode, and (ii) encoder portion 135 to direct encoder 120 to encode data signals to be transmitted in industry-compliant mode; which collectively cause Ethernet transceiver 100 to use encoder 120 and decoder 125 to respectively encode and decode data signals in industry-compliant mode (process step 255). In the illustrated embodiment, Ethernet transceiver 100 continues to operate in industry-compliant mode while mode controller 130 operates to sense whether data received at decoder 125 is in custom mode.

In response to sensing data received at decoder 125 in default custom mode ("N" branch of decision step 260), mode controller 130, and particularly, decoder portion 140 thereof, resets the operating mode of Ethernet transceiver 100 to default custom mode (process step 265) In resetting the operating mode of Ethernet transceiver 100, mode controller 130, and again, decoder portion 140, directs (i) decoder 125 to decode the received data signals in custom mode and (ii) encoder portion 135 to direct encoder 120 to encode data signals to be transmitted in custom mode; which collectively cause Ethernet transceiver 100 to use encoder 120 and decoder 125 to respectively encode and decode data signals in default custom mode.

According to one implementation of the preferred embodiment introduced here above, mode controller 130, in controlling operating modes of Ethernet transceiver 100, negotiates a communications channel between the computer system with which it is associated and another computer system associated with the computer network. Controller 130, in response thereto, enters into a master state or a slave state, and directs:

in response to entering the master state, encoder 120 to encode data to be transmitted to the another computer in a custom mode and, if the encoded data is not properly received by the another computer, to encode data to be transmitted to the another computer in an industry-compliant mode, or in response to entering the slave state, decoder 125 to decode data received from the another computer in the custom mode and, if the received data cannot properly be decoded, to decode the received data in the industry-compliant mode.

Figure 3:
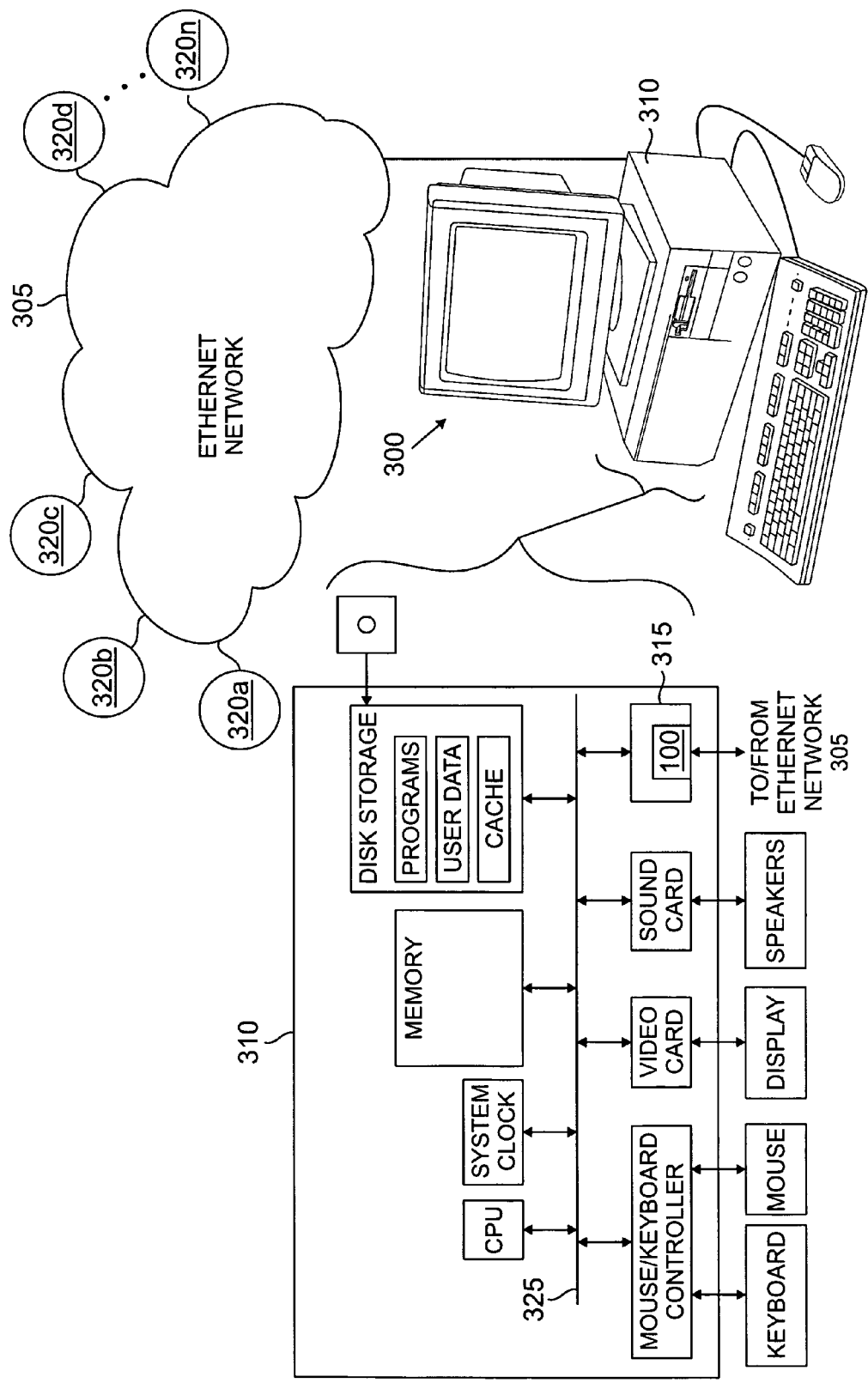
FIG. 3 illustrates a block diagram of an exemplary embodiment of a computer system in association with an exemplary computer network that is capable of providing a suitable environment within which the principles of the present invention may be implemented.

Referring next to FIG. 3, illustrated is a block diagram of an exemplary embodiment of a computer system (generally designated 300) in association with an exemplary Ethernet network 305. Exemplary computer system 300 is capable of providing a suitable environment within which the principles of the present invention may be implemented. Again, for purposes of illustration, concurrent reference is made to Ethernet transceiver 100 introduced with reference to FIG. 1, as well as the methods of operating Ethernet transceiver 100 that were introduced with reference to FIGS. 2a and 2b.

Computer system 300 illustratively includes a display device, a keyboard, a mouse and speakers, which cooperatively facilitate communication between computer system 300 and a user (not shown). Computer system 300 further includes a chassis 310 housing various electronic components comprising computer processing circuitry, illustratively including, a central processing unit ("CPU"), a system clock, a memory (which typically comprises volatile RAM memory, and a disk storage device (which typically comprises one or more readable/writeable fixed storage devices, such as a hard-disk drive, a removable storage device (e.g., a floppy disk, a ZIP disk, a CD-ROM disk, a DVD disk, etc.), or the like). In addition to computer processing circuitry, computer system 300 also comprises peripheral device circuitry illustratively including a mouse/keyboard controller, a video card, a sound card, and a peripheral card 315, such as a NIC.

Exemplary peripheral card 315 is operable to provide a communication interface associating computer system 300 with computer network 305 and to facilitate communication between computer system 300 and at least one of the plurality of other computer systems 320. According to the illustrated embodiment, Ethernet transceiver 100 is associated with peripheral card 315. Preferably, at least decoder portion 140 of mode controller 130 is embodied in peripheral card 315, and operates to allow computer system 300 to decode and process data received from at least one of other computer systems 320 via Ethernet network 305.

It should be noted that the computer processing circuitry and the peripheral device circuitry are associated via common bus circuitry 325, thereby associating peripheral card 315 with the CPU, the system clock, the memory and the storage device. Ethernet transceiver 100 is again associated with an encoder, decoder and a mode controller, such as those described illustratively with reference to the embodiments of FIGS. 1 to 2b. The mode controller (not shown), which need not be included within Ethernet transceiver 100, whether in whole or in part, again operates to control the operating modes thereof. The mode controller is operable, in response to sensing data received at the decoder, to direct respectively the decoder and the encoder to decode and encode received and transmitted data in industry-compliant mode or custom mode.

Those skilled in the pertinent art will note that the principles of the present invention may be implemented in any suitable computer processing environment, whether micro, mini, mainframe, super or like computers, including multi and parallel processing environments, as well as computer networks. To that end, conventional computer system architecture is more fully discussed in THE INDISPENSABLE PC HARDWARE BOOK, by Hans-Peter Messmer, Addison Wesley (2nd ed. 1995) and COMPUTER ORGANIZATION AND ARCHITECTURE, by William Stallings, MacMillan Publishing Co. (3rd ed. 1993); conventional computer and communications network design is more fully discussed in DATA NETWORK DESIGN, by Darren L. Spohn, McGraw-Hill, Inc. (1993); conventional data communication is more fully discussed in VOICE AND DATA COMMUNICATIONS HANDBOOK, by Bud Bates and Donald Gregory, McGraw-Hill, Inc. (1996); DATA COMMUNICATIONS PRINCIPLES, by R. D. Gitlin, J. F. Hayes and S. B. Weinstein, Plenum Press (1992); and THE IRWIN HANDBOOK OF TELECOMMUNICATIONS, by James Harry Green, Irwin Professional Publishing (2nd ed. 1992). Each of the foregoing publications is incorporated herein by reference for all purposes, as if fully set forth herein.

Figure 4:
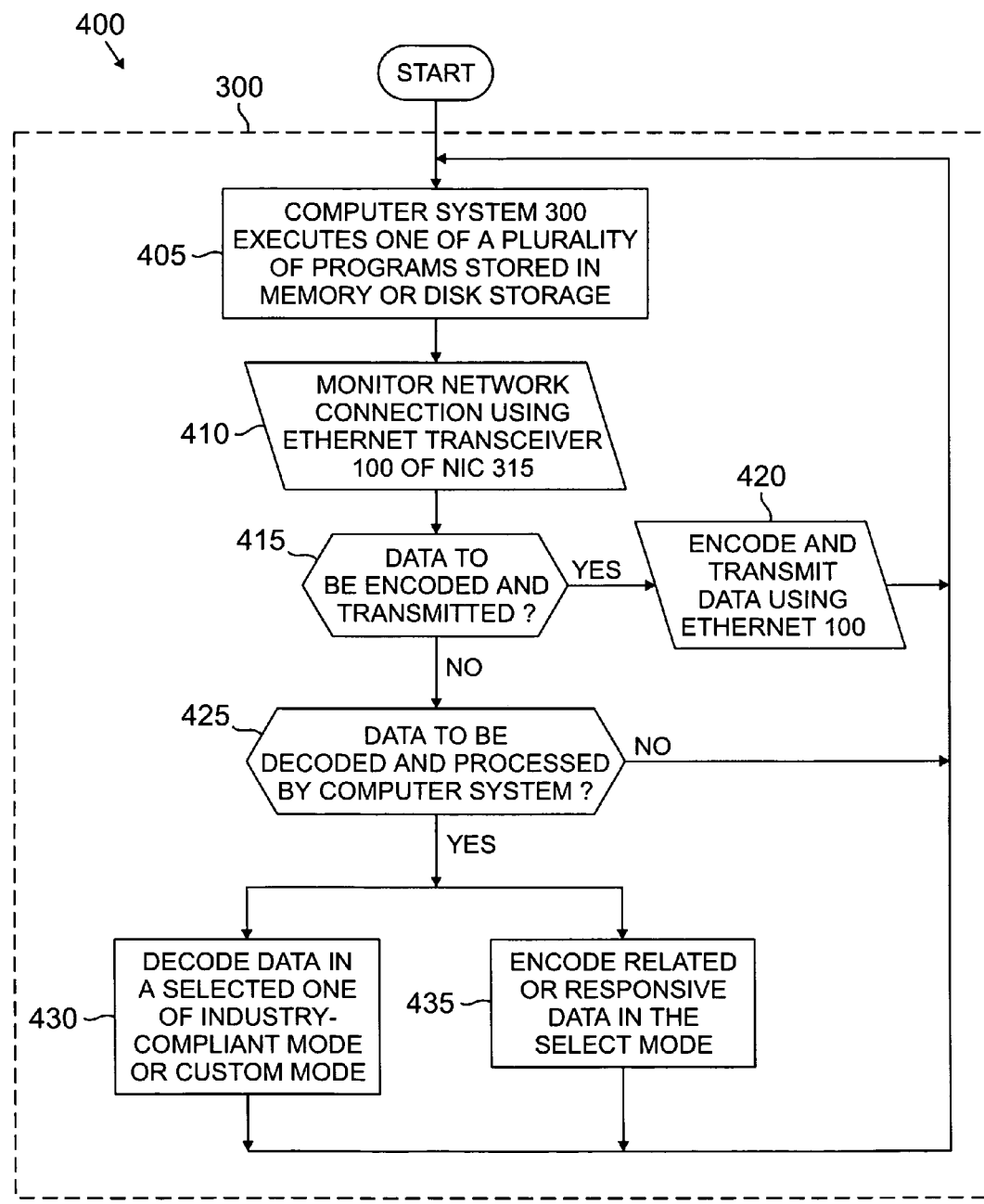
FIG. 4 illustrates a flow diagram of an exemplary method of operating the computer system in association with computer network of FIG. 3 to communicate in at least one of an industry-compliant mode and a custom mode, all in accord with the principles of the present invention.

Referring next to FIG. 4, illustrated is a flow diagram of an exemplary method of operating computer system 300 in association with computer network 305 of FIG. 3 (generally designated 400) to communicate in at least one of an industry-compliant mode and a custom mode, all in accord with the principles of the present invention. Again, for purposes of illustration, concurrent reference is made to the embodiments introduced with reference to FIGS. 1 to 3.

Exemplary method 400 operates computer system 300 having a network transceiver, such as Ethernet transceiver 100, to allow operating modes of transceiver 100 to be monitored and controlled for use in association with network 305. As above-introduced, the Ethernet specification, broadly speaking, is a LAN protocol advancing a bus or star topology that served as the basis for the IEEE 802.3ab standard, which specifies the physical and lower software layers.

According to the illustrated embodiment, computer system 300 executes ones of a plurality of programs stored in memory or disk storage (process step 405; e.g., application programs, system programs, etc.) while monitoring a network connection via NIC 315 and, particularly, Ethernet transceiver 100 (process step 410).

Upon a determination that data is present at encoder 120 for transmission to one of the other computer systems 320 via network 305 ("Y" branch of decision step 415), Ethernet transceiver 100 (again, associated with NIC 315) instructs encoder 120 to encode such data in one of at least an industry-compliant mode and a custom mode (process step 420). According to the embodiments introduced with reference to FIGS. 2a and 2b, one of these modes may suitably be designated a default mode, i.e., an encoding mode used to encode data unless directed otherwise; alternatively, the immediately-past encoding mode may suitably be used as the default mode; or some hybrid combination of the same may be adopted. It should be noted that in one advantageous embodiment, industry-compliant mode is a default mode; in another embodiment, custom mode is a default mode; and, in yet another embodiment, mode controller 130 has a default mode set to a most current (e.g., a last used, etc.) decode mode.

Upon a determination that data is present at decoder 125 for receipt computer system 300 from one of the other computer systems 320 via network 305 ("Y" branch of decision step 425), Ethernet transceiver 100 via mode controller 100 directs decoder 125 to decode such received data in a selected one of the industry-compliant mode or the custom mode, such selection made in response to the format of the received data, (process step 430) and directs encoder 120 to encode related, or otherwise subsequently responsive, data in the same selected mode (process step 435). As above-introduced with reference to FIGS. 2a and 2b, one of these modes may suitably be designated a default mode, i.e., a decoding mode used to decode data until data is sensed at decoder 125 in another mode; alternatively, the immediately-past decoding mode may also suitably be used as the default mode; or some hybrid combination of the same may be adopted.

More particularly, computer system 300 comprises Ethernet transceiver 100, which is associated with each of the CPU and memory, and operates generally to associate computer system 300 with Ethernet network 305. Ethernet transceiver 100 comprises an encoder, a decoder and a mode controller, wherein the mode controller controls the operating modes of Ethernet transceiver 100. In each of the three "default" embodiments, Ethernet transceiver 100 operates to negotiate a communications channel between computer system 300 and another computer system 320a-320n associated with Ethernet network 305, causing computer system 300 to enter one of a master state or a slave state.

In the embodiment wherein the default mode is the industry-compliant mode, mode controller 130 directs:

in response to entering the master state, the encoder to encode data to be transmitted to another computer 320 in an industry-compliant mode and, if the encoded data is not properly received by another computer 320, to encode data to be transmitted to another computer 320 in a custom mode; the decoder to decode data in the format accepted by another computer 320, and in response to entering the slave state, the decoder to decode data received from another computer 320 in the industry-compliant mode and, if the received data cannot properly be decoded, to decode the received data in the custom mode; the encoder to encode data in the format accepted by another computer 320.

In the embodiment wherein the default mode is the custom mode, mode controller 130 directs:

in response to entering the master state, the encoder to encode data to be transmitted to another computer 320 in a custom mode and, if the encoded data is not properly received by another computer 320, to encode data to be transmitted to another computer 320 in an industry-compliant mode; the decoder to decode data in the format accepted by another computer 320, and in response to entering the slave state, the decoder to decode data received from another computer 320 in the custom mode and, if the received data cannot properly be decoded, to decode the received data in the industry-compliant mode; the encoder to encode data in the format accepted by another computer 320.

Figure 5:
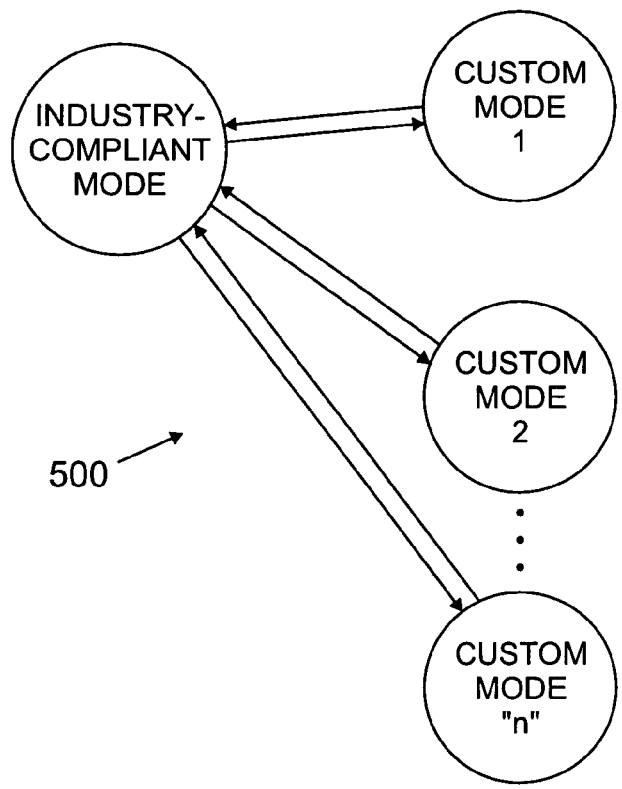
FIG. 5 illustrates exemplary state diagrams implementing alternative monitor and control switch logic that may be associated with the embodiments of the network transceiver introduced with reference to FIGS. 1 to 4.
Figure 5:
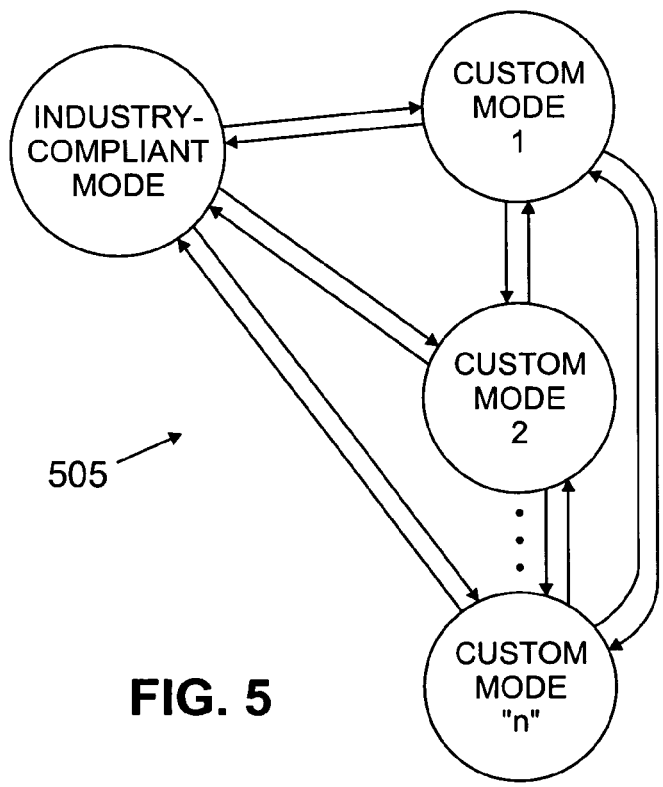

In another, regardless of the default mode, mode controller 130 repeatedly directs, in response to entering either the master state or the slave state, the encoder to encode data to be transmitted to the another computer in one of an industry-compliant mode and a custom mode until the encoded data is properly received by the another computer; or the decoder to decode data received from another computer 320 in industry-compliant mode and custom mode until the decoded data is properly received by transceiver Referring finally to FIG. 5, illustrated are exemplary state diagrams (generally designated 500 and 505) implementing alternate monitor and control switch logic that may be associated with network transceivers implemented in accord with the principles of the present invention, such as Ethernet transceiver 100 introduced with reference to FIGS. 1 to 4. For purposes of illustration, concurrent reference is made to FIGS. 1 to 4.

State machine 500 illustrates exemplary switch scenarios for encoder 120, decoder 125 and mode controller 130 implementing the logic of the above-described Ethernet transceiver embodiments wherein industry-compliant mode is a default mode. The switch scenarios are initiated by sensing data received in one of an industry-compliant mode and at least one custom mode at decoder 125. According to this embodiment, mode controller 130, in combination with encoder 125 and decoder 130, monitors and controls the two or more operating modes of Ethernet transceiver 100. Mode controller 130 again comprises encoder portion 135 and decoder portion 140. Ethernet transceiver 100 operates in default industry-compliant mode, whereas decoder portion 140 is operable, in response to sensing data received in custom mode at the decoder, to direct: (i) the decoder to decode the received data in custom mode, and (ii) the encoder portion to direct the encoder to encode data in custom mode. Upon a determination that the respective custom-mode communication is complete, Ethernet transceiver resets to communicating data in default industry-compliant mode. This may suitably be accomplished by sensing data in industry-compliant mode at decoder 125 or otherwise.

Alternatively, state machine 505 illustrates exemplary switch scenarios for encoder 120, decoder 125 and mode controller 130 implementing the logic of the above-described Ethernet transceiver embodiments wherein default mode changes over time is set to the immediately-past operating mode. The switch scenarios are initiated by sensing data received in one of an industry-compliant mode and at least one custom mode at decoder 125. According to this embodiment, mode controller 130, in combination with encoder 125 and decoder 130, monitors and controls the two or more operating modes of Ethernet transceiver 100. Ethernet transceiver 100 operates in the immediately-past operating mode, whether in industry-compliant or other custom mode, and decoder portion 140 is operable, in response to sensing data received in a different operating mode at the decoder, to direct: (i) the decoder to decode the received data in the different operating mode, and (ii) the encoder portion to direct the encoder to encode data in the different operating mode.

Although the present invention has been described in detail, those skilled in the art should understand that they can make various changes, substitutions and alterations herein without departing from the spirit and scope of the invention in its broadest form.

What is claimed is:

1. For use with a network transceiver having a decoder and an encoder, a controller that controls operating modes of the network transceiver, comprising:
   an encoder portion operable to direct said encoder to encode data in one of an industry-compliant mode and a custom mode; and
   a decoder portion operable, in response to sensing data received in said custom mode at said decoder, to direct:
      said decoder to decode said received data in said custom mode and
      said encoder portion to direct said encoder to encode data in said custom mode.

2. The controller for use with a network transceiver as recited in claim 1 further comprising a state machine that includes at least two alternate states indicating whether said custom mode is enabled.

3. The controller for use with a network transceiver as recited in claim 1 wherein at least said decoder portion is embodied in a peripheral card that is couplable to a computer system to allow said computer system to process said decoded data.

4. The controller for use with a network transceiver as recited in claim 1 further comprising a reset portion that is operable to direct said controller to reset said operating mode of the network transceiver to said industry-compliant mode.

5. The controller for use with a network transceiver as recited in claim 4 wherein said reset portion is associated with said decoder portion and operates to direct said decoder portion to direct:
   said decoder to decode said received data in said industry-compliant mode and
   said encoder portion to direct said encoder to encode data in said industry-compliant mode.

6. The controller for use with a network transceiver as recited in claim 1 wherein said decoder portion is further operable, in response to sensing data received in said industry-compliant mode at said decoder, to direct said decoder to decode said received data from said industry-compliant mode.

7. The controller for use with a network transceiver as recited in claim 6 wherein said decoder portion is further operable to direct said encoder portion to control data transmission from said encoder in said industry-compliant mode.

8. The controller for use with a network transceiver as recited in claim 1 wherein said industry-compliant mode is compliant with IIEEE 802.3ab.

9. For use with a network transceiver having a decoder, an encoder, and a controller associated therewith, a method of operating said controller to allow operating modes of the network transceiver to be monitored and controlled, said method comprising the steps of:
   sensing data received at said decoder in one of an industry-compliant mode and a custom mode; and
   directing said encoder, in response to sensing data received in said custom mode at said decoder, to encode data in said custom mode.

10. The method of operating the controller as recited in claim 9 wherein said directing step further comprises directing said decoder to decode said received data from said custom mode.

11. The method of operating the controller as recited in claim 9 further comprising the step of using a state machine having at least two alternate states to indicate whether said custom mode is enabled.

12. The method of operating the controller as recited in claim 9 wherein at least a decoder portion of the controller is embodied in a peripheral card that is couplable to a computer system and said method further comprises the step of controlling communication of said decoded data from the network transceiver to said computer system.

13. The method of operating the controller as recited in claim 9 further comprising the step of resetting said operating mode of the network transceiver to said industry-compliant mode.

14. The method of operating the controller as recited in claim 13 wherein said resetting step comprises the step of directing:
   said decoder to decode said received data from said industry-compliant mode and
   said encoder to encode data in said industry-compliant mode.

15. The method of operating the controller as recited in claim 9 wherein said directing step further comprises directing said encoder, in response to sensing data received in said industry-compliant mode at said decoder, to encode data in said industry-compliant mode.

16. The method of operating the controller as recited in claim 9 wherein said directing step further comprises directing said decoder, in response to sensing data received in said industry-compliant mode at said decoder, to decode received data from said industry-compliant mode.

17. The method of operating the controller as recited in claim 9 wherein said industry-compliant mode is compliant with IIEEE 802.3ab.

18. A network transceiver that is couplable to a computer system, comprising:
   an encoder that encodes data to be transmitted by said network transceiver;
   a decoder that decodes data received by said network transceiver; and
   a controller, associated with said decoder and said encoder, that controls operating modes of said network transceiver, comprising:
      an encoder portion operable to direct said encoder to encode data in one of an industry-compliant mode and a custom mode; and
      a decoder portion operable, in response to sensing data received in said custom mode at said decoder, to direct:
         said decoder to decode said received data in said custom mode and
         said encoder portion to direct said encoder to encode data in said custom mode.

19. The network transceiver as recited in claim 18 further comprising a state machine that includes at least two alternate states indicating whether said custom mode is enabled.

20. The network transceiver as recited in claim 18 wherein at least said decoder portion is embodied in a peripheral card that is couplable to the computer system to allow the computer system to process said decoded data.

21. The network transceiver as recited in claim 18 wherein said controller further comprises a reset portion that is operable to direct said controller to reset said operating mode of the network transceiver to said industry-compliant mode.

22. The network transceiver as recited in claim 21 wherein said reset portion is associated with said decoder portion and operates to direct said decoder portion to direct:

said decoder to decode said received data in said industry-compliant mode; and said encoder portion to direct said encoder to encode data in said industry-compliant mode.

23. The network transceiver as recited in claim 18 wherein said decoder portion is further operable, in response to sensing data received in said industry-compliant mode at said decoder, to direct said decoder to decode said received data from said industry-compliant mode.

24. The network transceiver as recited in claim 23 wherein said decoder portion is further operable to direct said encoder portion to control data transmission from said encoder in said industry-compliant mode.

25. The network transceiver as recited in claim 18 wherein said industry-compliant mode is compliant with IEEE 802.3ab.

26. For use with a computer system having a network transceiver, a method of operating said network transceiver to allow operating modes thereof to be monitored and controlled, said method comprising the steps of:

sensing data received at a decoder associated with said network transceiver in one of an industry-compliant mode and a custom mode; and encoding data to be transmitted by said network transceiver in response to sensing data received at said decoder in said custom mode.

27. The method of operating the network transceiver as recited in claim 26 further comprising the step of decoding data in response to sensing data received at said decoder in said custom mode.

28. The method of operating the network transceiver as recited in claim 26 further comprising the step of encoding data in said industry-compliant mode.

29. The method of operating the network transceiver as recited in claim 26 further comprising the step of decoding data in said industry-compliant mode.

30. The method of operating the network transceiver as recited in claim 26 wherein the network transceiver comprises a controller associated with said decoder and said encoder, and said method further comprises the step of using said controller to direct said encoder to encode data in one of an industry-compliant mode and said custom mode.

31. The method of operating the network transceiver as recited in claim 30 wherein said using step further comprises directing said decoder to decode said received data from said custom mode.

32. The method of operating the network transceiver as recited in claim 26 further comprising the step of using a state machine having at least two alternate states to indicate whether said custom mode is enabled.

33. The method of operating the network transceiver as recited in claim 26 wherein at least a portion of the network transceiver is embodied in a peripheral card that is couplable to a computer system and said method further comprises the step of controlling communication of said decoded data from the network transceiver to the computer system.

34. The method of operating the network transceiver as recited in claim 26 further comprising the step of resetting said operating mode of the network transceiver to said industry-compliant mode.

35. The method of operating the network transceiver as recited in claim 34 wherein said resetting step comprises the steps of directing:

said decoder to decode said received data in said industry-compliant mode and said encoder to encode data in said industry-compliant mode.

36. The method of operating the network transceiver as recited in claim 26 further comprising the step of directing said encoder, in response to sensing data received in said industry-compliant mode at said decoder, to encode data in said industry-compliant mode.

37. The method of operating the network transceiver as recited in claim 26 further comprising the step of directing said decoder, in response to sensing data received in said industry-compliant mode at said decoder, to decode received data from said industry-compliant mode.

38. The method of operating the network transceiver as recited in claim 26 wherein said industry-compliant mode is compliant with IEEE 802.3ab.

39. A computer system for association with an Ethernet network, comprising:

a processing unit;

a memory, associated with said processing unit;

an Ethernet transceiver, associated with said processing unit and said memory, that associates said computer system with said Ethernet network, said Ethernet transceiver comprising:

an encoder that encodes data to be transmitted by said Ethernet transceiver over said Ethernet network;

a decoder that decodes data received by said Ethernet transceiver over said Ethernet network; and controller, associated with said decoder and said encoder, for controlling operating modes of said Ethernet transceiver, said controller operable to (i) negotiate a communications channel between said computer system and another computer system associated with said Ethernet network, said computer system entering one of a master state and a slave state, (ii) direct, in response to entering said master state, said encoder to encode data to be transmitted to said another computer in an industry-compliant mode and, if said encoded data is not properly received by said another computer, to encode data to be transmitted to said another computer in a custom mode, (iii) direct, in response to entering said slave state, said decoder to decode data received from said another computer in said industry-compliant mode and, if said received data cannot properly be decoded, to decode said received data in said custom mode.

40. The computer system as recited in claim 39 wherein said controller is further operable to direct, in response to entering said master state, said decoder to decode data received from said another computer in one of said industry-compliant mode and said custom mode.

41. The computer system as recited in claim 39 wherein said controller is further operable to direct, in response to entering said slave state, said encoder to encode data to be transmitted to said another computer in one of said industry-compliant mode and said custom mode.

42. The computer system as recited in claim 39 wherein said controller is further operable to direct, in response to entering said slave state, said encoder to encode data to be transmitted to said another computer in one of said industry-compliant mode and said custom mode.

43. A computer system for association with an Ethernet network, comprising:
- a processing unit;
- a memory, associated with said processing unit;
- an Ethernet transceiver, associated with said processing unit and said memory, that associates said computer system with said Ethernet network, said Ethernet transceiver comprising:
  - an encoder that encodes data to be transmitted by said Ethernet transceiver over said Ethernet network;
  - a decoder that decodes data received by said Ethernet transceiver over said Ethernet network; and
  - a controller, associated with said decoder and said encoder, for controlling operating modes of said Ethernet transceiver, said controller operable to (i) negotiate a communications channel between said computer system and another computer system associated with said Ethernet network, said computer system entering one of a master state and a slave state, (ii) direct, in response to entering said master state, said encoder to encode data to be transmitted to said another computer in a custom mode and, if said encoded data is not properly received by said another computer, to encode data to be transmitted to said another computer in an industry-compliant mode, (iii) direct, in response to entering said slave state, said decoder to decode data received from said another computer in said custom mode and, if said received data cannot properly be decoded, to decode said received data in said industry-compliant mode.

44. The computer system as recited in claim 43 wherein said controller is further operable to direct, in response to entering said master state, said decoder to decode data received from said another computer in one of said industry-compliant mode and said custom mode.

45. The computer system as recited in claim 43 wherein said controller is further operable to direct, in response to entering said slave state, said encoder to encode data to be transmitted to said another computer in one of said industry-compliant mode and said custom mode.

46. The computer system as recited in claim 43 wherein said controller is further operable to direct, in response to entering said slave state, said encoder to encode data to be transmitted to said another computer in one of said industry-compliant mode and said custom mode.

47. A computer system for association with an Ethernet network, comprising:
- a processing unit;
- a memory, associated with said processing unit;
- an Ethernet transceiver, associated with said processing unit and said memory, that associates said computer system with said Ethernet network, said Ethernet transceiver comprising:
  - an encoder that encodes data to be transmitted by said Ethernet transceiver over said Ethernet network;
  - a decoder that decodes data received by said Ethernet transceiver over said Ethernet network; and
  - a controller, associated with said decoder and said encoder, for controlling operating modes of said Ethernet transceiver, said controller (i) negotiates a communications channel between said computer system and another computer system associated with said Ethernet network, said computer system entering one of a master state and a slave state, and (ii) repeatedly directs, in response to entering one of said master state and said slave state, said encoder to encode data to be transmitted to said another computer in one of an industry-compliant mode and a custom mode until said encoded data is properly received by said another computer.

48. The computer system as recited in claim 47 wherein said controller is further operable to decode data received from said another computer in one of said custom mode and said industry-compliant mode.

49. The computer system as recited in claim 47 wherein said controller is further operable to terminate said repeatedly encoding data in said one of an industry-compliant mode and a custom mode as a function of a threshold.

50. The computer system as recited in claim 47 wherein said controller is further operable to randomly select one of said industry-compliant mode and said custom mode and to encode data to be transmitted to said another computer in said randomly selected one of said industry-compliant mode and said custom mode.

51. The computer system as recited in claim 47 wherein said controller is further operable to randomly select one of said industry-compliant mode and said custom mode in response to said encoded data is not properly received by said another computer and to encode data to be transmitted to said another computer in said randomly selected one of said industry-compliant mode and said custom mode.

\* \* \* \* \*

UNITED STATES PATENT AND TRADEMARK OFFICE
CERTIFICATE OF CORRECTION

| | | |
|---|---|---|
| PATENT NO. | : 7,372,863 B2 | Page 1 of 2 |
| APPLICATION NO. | : 09/751037 | |
| DATED | : May 13, 2008 | |
| INVENTOR(S) | : Peter J. Sallaway, Douglas Easton and Matt Webb | |

It is certified that error appears in the above-identified patent and that said Letters Patent is hereby corrected as shown below:

On title page Item (57) "Abstract", delete in its entirely and insert -- Disclosed herein are systems for monitoring and controlling operating modes in a network transceiver having a decoder and an encoder, as well as methods of operating the same. According to an exemplary embodiment, a controller is introduced for use with the Ethernet transceiver. The controller is associated with the encoder and decoder, and operates to control operating modes of the Ethernet transceiver. The controller includes both an encoder portion and a decoder portion. The encoder portion is operable to direct the encoder to encode data in one of an industry-compliant mode and a custom mode. The decoder portion is operable, in response to sensing data received in custom mode at the decoder, to direct: (i) the decoder to decode the received data in custom mode, and (ii) the encoder portion to direct the encoder to encode data in custom mode. --

Column 11, claim 1, line 21, after "mode" insert -- ; --

Column 11, claim 5, line 44, after "mode" insert -- ; --

Column 11, claim 8, line 60, delete "IIEEE" and insert -- IEEE --

Column 12, claim 14, line 26, after "mode" insert -- ; --

Column 12, claim 17, line 41, delete "IIEEE" and insert -- IEEE --

Column 12, claim 18, line 58, after "mode" insert -- ; --

Column 13, claim 26, lines 33 and 34, after "tranceiver" insert -- in said custom mode --

Column 13, claim 30, line 49, delete "said" and insert -- an --

Column 13, claim 30, line 52, delete "an" and insert -- said --

Column 14, claim 35, line 9, after "mode" insert -- ; --

UNITED STATES PATENT AND TRADEMARK OFFICE
CERTIFICATE OF CORRECTION

PATENT NO.          : 7,372,863 B2
APPLICATION NO.  : 09/751037
DATED                  : May 13, 2008
INVENTOR(S)         : Peter J. Sallaway, Douglas Easton and Matt Webb It is certified that error appears in the above-identified patent and that said Letters Patent is hereby corrected as shown below:

Column 14, claim 35, line 10, delete "said" (first occurrence) and insert -- an --

Column 14, claim 36, line 14, delete "said" (first occurrence) and insert -- an --

Signed and Sealed this

Twenty-second Day of December, 2009

David J. Kappos
*Director of the United States Patent and Trademark Office*